United States Patent [19]
Woo

[11] Patent Number: 5,400,150
[45] Date of Patent: Mar. 21, 1995

[54] SCREEN ENCORE METHOD BY REEL-SENSING IN A VIDEO TAPE RECORDER SYSTEM

[75] Inventor: Jong-Sam Woo, Suwon, Rep. of Korea

[73] Assignee: SamSung Electronics Co., Ltd., Kyungki, Rep. of Korea

[21] Appl. No.: 418,219

[22] Filed: Oct. 6, 1989

[30] Foreign Application Priority Data

Oct. 14, 1988 [KR] Rep. of Korea ............... 1988-13426

[51] Int. Cl.$^6$ ............................................. G11B 15/18
[52] U.S. Cl. ................... 358/335; 358/311; 360/71; 360/72.3
[58] Field of Search ............... 358/335, 311; 360/14.1, 360/15, 69; 360/14.2, 13, 71, 723

[56] References Cited

U.S. PATENT DOCUMENTS

| | | | |
|---|---|---|---|
| 4,210,785 | 7/1980 | Huber et al. | 360/72.2 |
| 4,210,940 | 7/1980 | Prysby et al. | 360/72.3 |
| 4,215,378 | 7/1980 | Sato et al. | 360/72.4 |
| 4,413,292 | 11/1983 | Sugiyama et al. | 360/72.2 |
| 4,499,509 | 2/1985 | Gohda et al. | 360/72.1 |
| 4,587,577 | 5/1986 | Tsunoda | 360/72.2 |
| 4,628,377 | 12/1986 | Harigaya | 360/72.3 |
| 4,716,558 | 12/1987 | Katayama et al. | 369/33 |
| 4,847,708 | 7/1989 | Furuyama | 360/72.1 |
| 4,866,542 | 9/1989 | Shimada et al. | 358/335 |
| 4,963,999 | 10/1990 | Utsunomiya et al. | 360/72.3 |

*Primary Examiner*—Tommy Chin
*Assistant Examiner*—Huy Nguyen
*Attorney, Agent, or Firm*—Robert E. Bushnell

[57] ABSTRACT

A screen encore method capable of displaying again (encore) a block of pictures designated by a user or a last picture with a single key by software control, without adding hardware, so that the inventive system is highly improved both in its function and quality. The inventive system for embodying the method includes: a micom for controlling basic functions of the Video Tape Recorder (VTR) system and functions of the inventive subject; a delay device for indicating to the user the status of the VTR system under the control of the micom; a mechanism for implementing the insertion/ejection of video tapes and tape loading/unloading by the control signals coming from the micom; a video and audio signal controller for controlling video and audio signals under the control of the micom; a remote control receiver for receiving remote control signals from a remote control set to filter and amplify the signals, thereby to transmit them the micom; a sensor for sensing the present operational location of the mechanism and the status of the beginning/end of tapes to transfer the sensed data to the micom; and a keyboard, as a key input running the VTR's functions, for inputting function key and command key to the micom including an encore key.

12 Claims, 5 Drawing Sheets

SCREEN ENCORE METHOD BY REEL-SENSING IN A VIDEO TAPE RECORDER SYSTEM

BACKGROUND OF THE INVENTION

The present invention relates to a method of recording and reproducing video signals by processing key functions, and more particularly, to a screen encore function in which the complicated key operation is avoided when a user wants to view previous pictures during the process of recording/reproducing video signals, and in which it is possible to see only past pictures with reel-pulse sensing or time setting technique, without adding or changing hardware in a VTR, video tape recorder.

Generally, if a user wants to see a previously displayed picture, recently displayed or displayed a considerable time ago, again when reviewing reproduced images on a Video Tape Recorder (VTR), a number of key operations are required. That is, the following complicated key sequences are required of rewind key (REW) →stop key(STOP)→play key(PLAY) or play key(PLAY)→ Reverse Picture Search key(RPS)→play key(PLAY). Also, another disadvantage is that it is not possible to see the desired picture during the operation of REW→STOP→PLAY keys and therefore it is difficult to find out the exact point of the desired picture on a video tape.

SUMMARY OF THE INVENTION

Therefore, an object of the present invention is to provide a screen encore function capable of displaying again (encore) a block of pictures designated by a user or an immediately previous picture with a single key and software controlled without additional hardware.

Another object of the present invention is to provide a screen encore method capable of realizing a highly improved product in both function and quality.

According to an aspect of the invention, the invention includes: a micom (microcomputer) for controlling basic functions of the VTR system and functions of the inventive subject; a display device for indicating to the user the status of the VTR system, under the control of the micom; a mechanism for implementing the insertion/ejection of video tapes and tape loading/unloading by the control signals coming from the micom; a video and audio signal controller for controlling video and audio signals under the control of the micom; a remocon (remote control) receiver for receiving remote control signals from a remocon set (not shown) to filter and amplify the signals, thereby to transmit them to the micom; a sensor for sensing the present operational location of the mechanism and the status of the beginning/end of tapes to transfer the sensed data to the micom; and a keyboard, as a key input running the VTR's functions, for inputting a function key and a command key to the micom including an encore key.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

The above and other objects and features of the invention will appear more fully hereinafter from a consideration of the following description taken in connection with the accompanying drawings in which the invention is illustrated.

Figure 1:
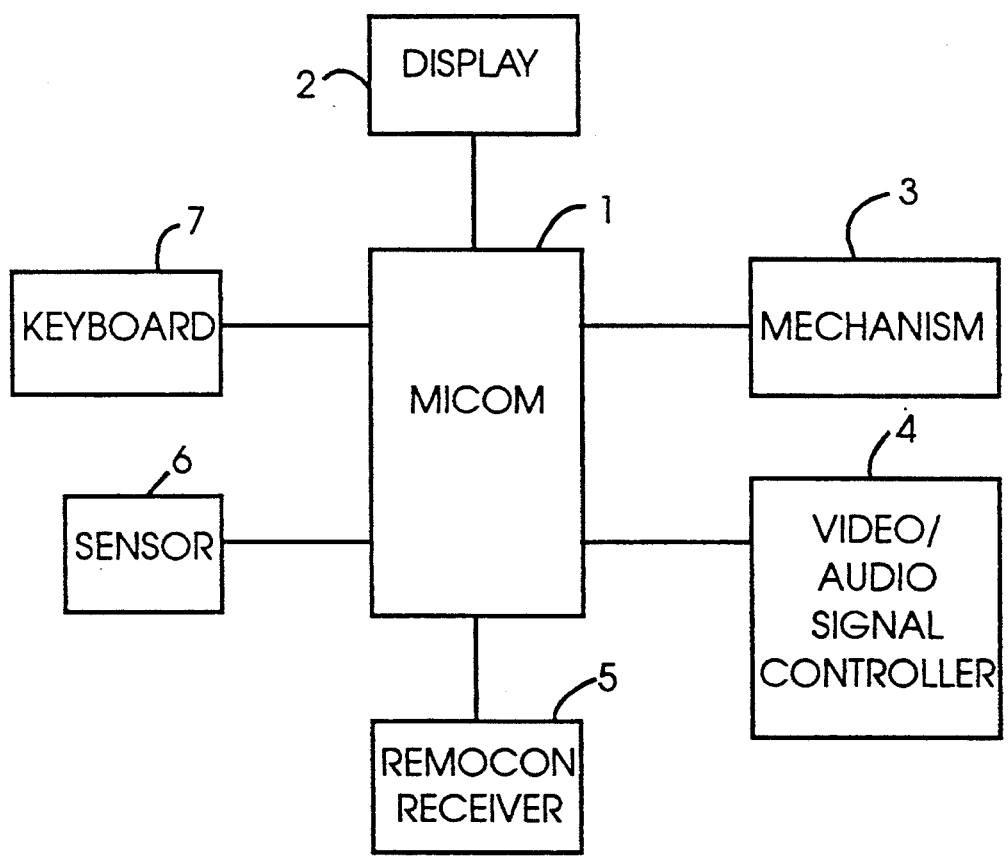
FIG. 1 illustrates a system block diagram for implementing the inventive method according to the present invention.

FIG. 1 is a system block diagram for accomplishing the present invention. A micom 1 controls basic functions of the VTR system and functions of the inventive subject. A display device 2 indicates to the user the status of the VTR system under the control of the micom 1. A mechanism 3 implements the insertion/ejection of video tapes and tape loading/unloading in response to control signals coming from the micom 1. A video and audio signal controller 4 controls video and audio signals under the control of the micom 1. A remocon receiver 5 receive remote control signals from a remocon set (not shown in the drawing) to filter and amplify the remote control signal, transmit them to the micom 1. A sensor 6 senses the present operational location of the mechanism 3 and the status of the beginning/end of tapes and transfers the sensed data to the micom 1. A keyboard 7, providing a user interface for control of the VTR's functions, inputs function and command keys signals to the micom 1 an encore key.

Figure 2:
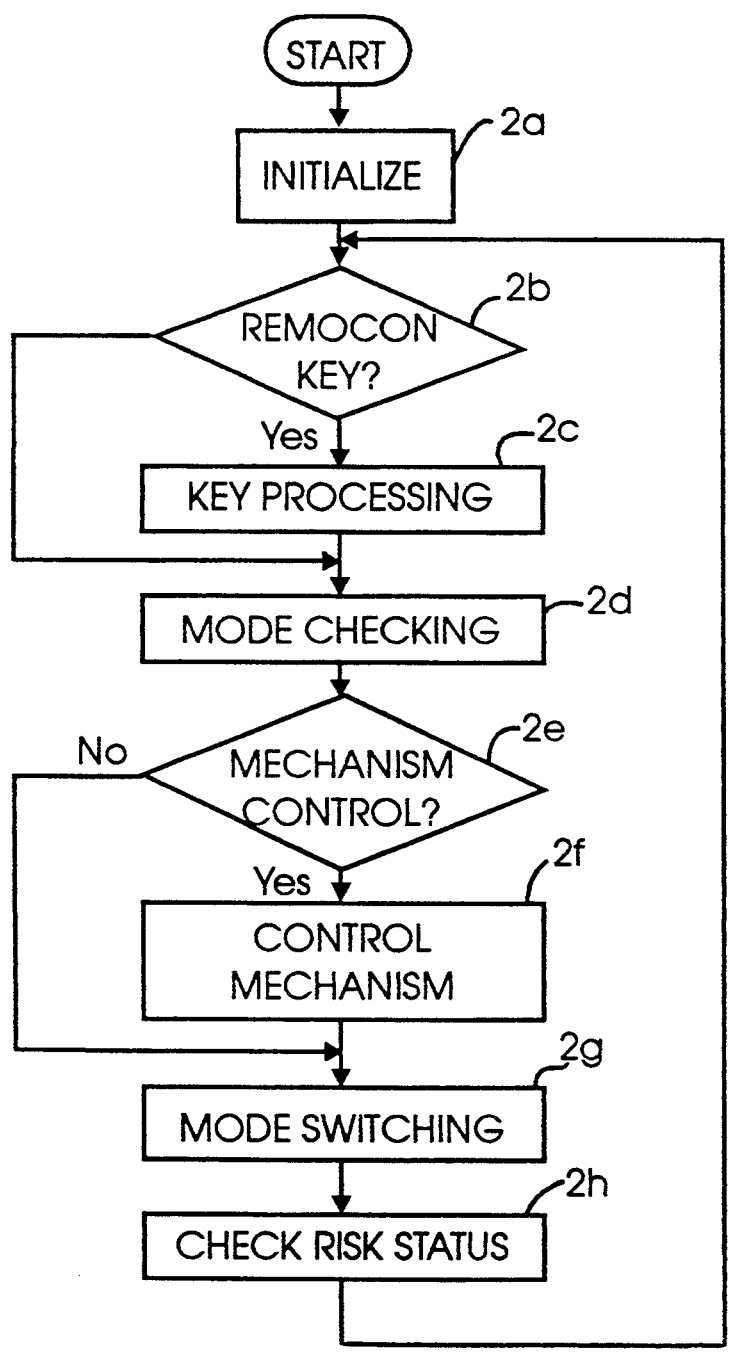
FIG. 2 illustrates a main flow chart according to the present invention.

FIG. 2 is a flow chart according to the present invention. In a first step, the system initialization and key input is checked. In a second step, key functions such as key branch or encore are processed to check the mode if the remocon or panel key was entered in the first step, or directly the mode is checked if no key was entered in a first step. In a third step, the presence of a mechanism control mode is checked after checking the mode at the second step, or directly the mode is varied if it is not the mechanism control mode. In a fourth step, the sensing data of the sensor and risk status of the mechanism is checked according to the third step and the mode switching.

Figure 3A:
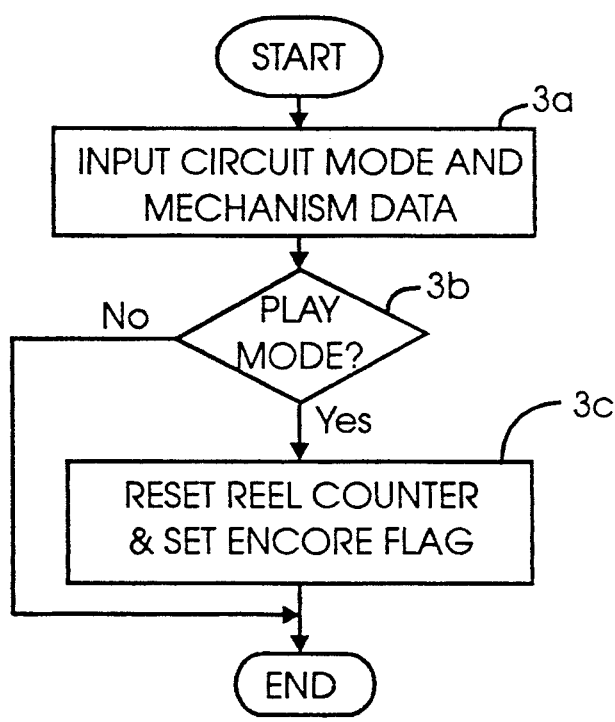
FIG. 3(A) illustrates play key processing according to the present invention.
Figure 3B:
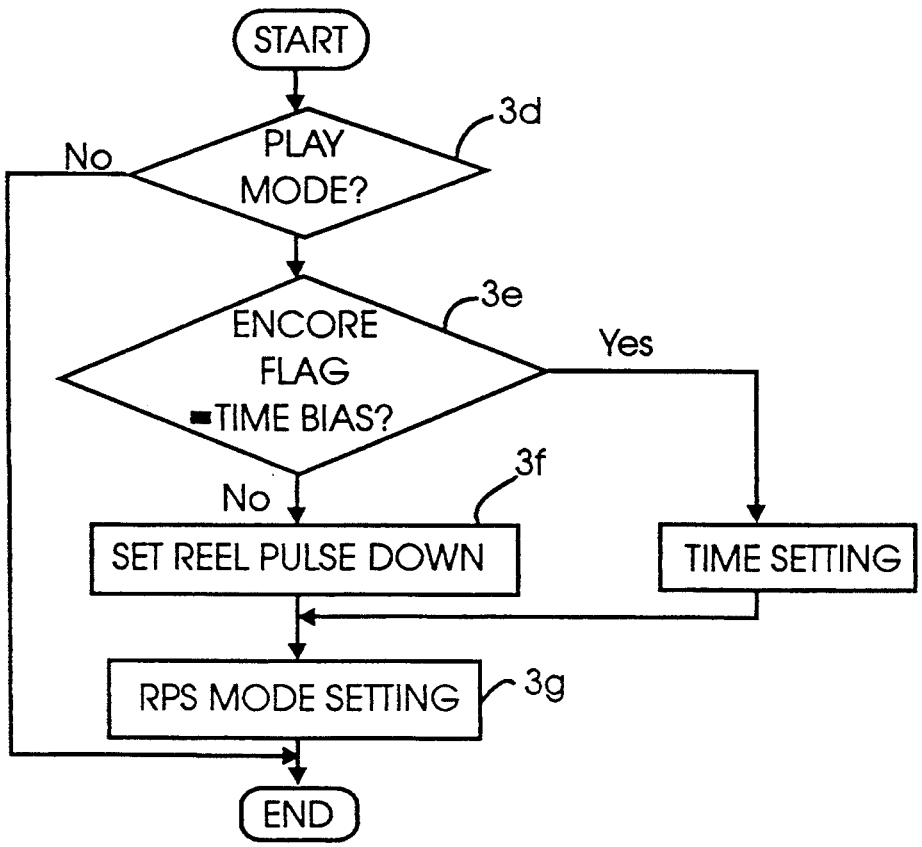
FIG. 3(B) illustrates encore key processing.

FIGS. 3A, 3B are specific flow charts for play and encore key processing in the process of the key branch and key functions of FIG. 2 according to the present invention, in which:

FIG. (3A) is a flow chart of the play key processing; and

FIG. (3B) is a flow chart of the encore key processing.

Figure 4A:
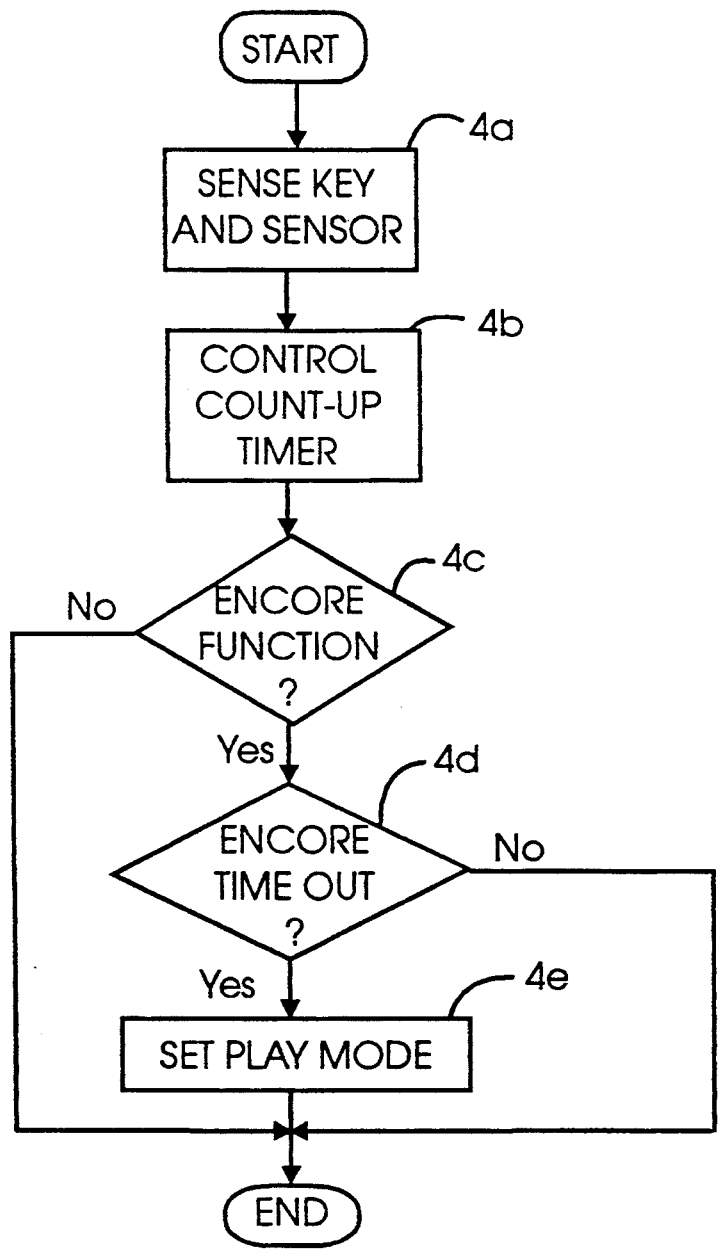
FIG. 4(A) illustrates a flow chart of the interrupt processing according to the present invention.
Figure 4B:
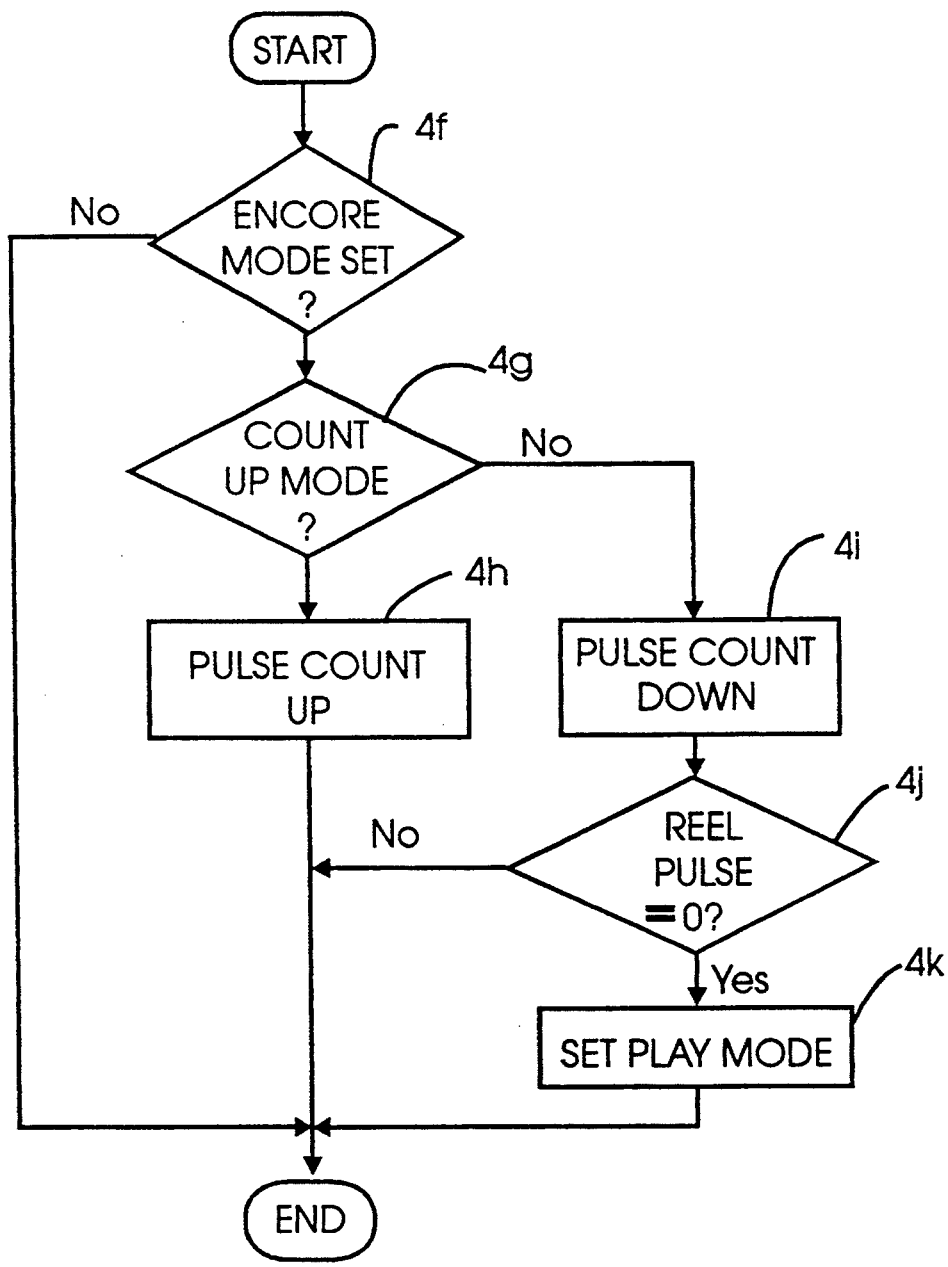
FIG. 4(B) illustrates a specific flow chart of play/encore key processing.

FIG. 4 illustrates specifically a flow chart of the interrupt processing according to the present invention, in which:

FIG. (4A) is a flow chart of the time interrupt; and

FIG. (4B) is a flow chart of the external interrupt rotation of reels.

Hereinafter a preferred embodiment of the present invention is explained in detail with reference to FIGS. 1 through 4.

FIG. 1 illustrates the known configuration in which the micom 1 is operated by the key input selected by the user through the keyboard 7. The micom 1 controls the movement of mechanism 3 and process of the video/audio signal controller 4 based on the sense signal of sensor 6 by the signal inputted through keyboard 7. Accordingly, the status of the operation and function processing of the VTR system due to the key processing of micom 1 are to be display on the displaying device 2. The present invention is aimed at eliminating all the inconveniences and the additional parts by supporting the encore function only using software, so the reel pulse sensed in the sensor 6 is inputted into the micom 1 to perform the encore function.

When power is on, the micom 1 initializes the status of data input/output port and a memory at a step 2a of FIG. 2, and loads the default value to enable the interrupt status. It also checks at a step 2b if the remocon key for remote control is inputted from a panel key of the keyboard 7 or the remocon receiver 5. According to the key inputted at the step 2b, a corresponding key processing is performed and the input of encore key is processed as well in a step 2c.

Then the mode of the key input is checked at a step 2d, and at a step 2e the micom 1 checks if the mode at step 2d is for the control of mechanism 3. At the step 2e, the micom 1 switches the corresponding mode at a step 2g only if the mode is not for the control of the mechanism 3, however if it is for the control of the mechanism 3, the micom 1 inputs a control signal into the mechanism 3 at a step 2f to control the mechanism 3. When the control of the mechanism 3 is completed, the mode is switched at a step 2g and, at a step 2h, the driving status of the mechanism 3 and the risk status according to the driving of the mechanism 3 are checked. In the processing according to key branch and key function of the step 2c, the corresponding values other than the play and the encore keys should be reset. FIG. 3 shows specifically the operational steps corresponding to the processing.

Referring to FIG. 3(A), the flow chart of play key processing, it is checked whether or not the current mode is the play mode at a step 3b by entering the mode currently being processed and mechanism data at a step 3a, thereafter if it is in the play mode, the reel pulse counter is reset and pulse counting-up becomes possible. Further a corresponding flag is set as a reel pulse encore in response to the encore key. The processing of encore key function checks if the current mode is the play mode at a step 3d of FIG. 3(B). If it is the play mode at the step 3d, the micom 1 checks if encore is based on time or on reel pulse at a step 3e. If reel pulse is the basis at the step 3e, the reel pulse is set for down-counting at a step 3f, or if time is the basis, the desired time is set at a step 3h.

After the step 3f or 3h is set, a reverse picture search (hereinafter referred to as RPS) mode is set. It causes the micom 1 of the VTR system to sense the key input of the remocon receiver 5 and the keyboard 7 and the status inputted through the sensor 6 at a step 4a of FIG. 4(A), to control the timer of mechanism 3 to be count-up at a step 4b and to check if it is encore function at a step 4c. If it is the encore key function at the step 4c, it is checked if the encore time has run out. If the encore time ran out (actually this period is the RPS period), the play mode is set at a step 4e, or the operation ends if the steps 4c, 4d are neither the encore key input nor the encore time (the time interrupting is a routine running repeatedly at a regular interval). A reel pulse signal external interrupt swings between high/low whenever the reel rotates itself.

When reel pulse signal is transferred to the micom 1, the micom 1 receives play key in the play mode to count up the buffer value according to the inputted reel pulse signal. Then, the micom 1 checks if the encore mode is set, at a step 4f of FIG. 4(B). That is, the buffer value is counted up at a step 4h when the count-up pulse is inputted at a step 4g, whereas it is checked at a step 4j if the counted reel pulse signal value is zero by counting down the buffer value at a step 4i when count-up pulse is not inputted. When the resulting value of the step is zero, the play mode is set at a step 4k, or the operation ends when it is not zero. That is, the encore key function is available only in power-on play mode, and the RPS mode is performed during the preset time only if the encore key is entered in the play mode.

Moreover, the function is run in a automatic play mode when time-count is completed, but the encore function is ignored if other keys are inputted during the RPS mode. If the play key is inputted again in the play mode, the reel pulse signal counting is performed again after resetting the counted reel pulse. If the encore key is pressed, then the RPS function is performed as many times as the number of reel pulses counted.

In addition, after the play key is inputted in the play mode, the play mode operates again automatically if a given number of reel pulses are inputted. In this case also, the encore function is ignored if other keys are inputted during the RPS mode. Also, when the play key is inputted during the play mode, that is, the reel pulse is reset and counted, it is indicated to the user under the control of micom 1 through the display 2, and it is also the same in case of the encore RPS (for example, a specific portion of the screen is blanked during operation of a mode-display LED, namely the play mode is blanked for the play key input, whereas the review mode is blanked for the screen encore mode).

As described above, the advantage of the present invention is to allow the user to see the preset block of pictures or immediately past picture again simply by using the encore key, which is possible using software and without adding external hardware.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A screen encore method for a video tape recorder, said method comprising the steps of:

during a play mode, resetting a reel pulse counter for counting reel pulse signals generated by a reel pulse sensor and setting an encore flag in response to user selection of a play key, said play key for activating said play mode;

in response to user selection of an encore function, determining whether said encore flag is indicative of a timed encore function;

enabling user input of a reverse time for a performing reverse picture search mode if said encore flag is determined to be indicative of said timed encore function or enabling decrementing of a count value in said reel pulse counter in response to said reel pulse signals if said encore flag is determined to be not indicative of said timed encore function; and operating said video tape recorder in said reverse picture search mode for said reverse time if said encore flag is indicative of said timed encore function or until said count value reaches zero if said encore flag is not indicative of said timed encore function.

2. The method as claimed in claim 1, further comprising the steps of:

counting reel pulses of a reel rotating in said video tape recorder to increment said count value in response to said user selection of said play key; and switching video tape recorder to said play mode if said count value reaches zero.

3. A method for performing a screen encore function in a video tape recorder, said method comprising:

during a play function for reproducing video signals recorded on a video tape, enabling a user designation of an encore start position;

counting reel pulse signals in response to the user designation of said encore start position to thereby generate a first count;

in response to user selection of said screen encore function, terminating said first count, performing a rewind function, and generating a second count of said reel pulse signals during said rewind function; and terminating said rewind function and performing said play function in response to a result of a comparison between said first count and said second count.

4. A method as claimed in claim 3, wherein said rewind function is terminated when said second count equals said first count.

5. A method as claimed in claim 3, wherein said reel pulse signals are generated by a sensor detecting rotation of reels carrying said video tape.

6. A method as claimed in claim 3, wherein said user designates said encore start position by activating a play key, said play key also for activating said play function.

7. A method as claimed in claim 3, wherein said rewind function is a reverse picture search function.

8. A method for performing a screen encore function in a video tape recorder, said method comprising:

during a play function for reproducing video signals recorded on a video tape, enabling a user designation of an encore start position;

counting reel pulse signals and setting an encore flag in response to the user designation of said encore start position to thereby generate a first count;

in response to user selection of said screen encore function, determining if said encore flag is set;

if said encore flag is set, terminating said first count, performing a first rewind function, generating a second count of said reel pulse signals during said first rewind function, terminating said first rewind function and performing said play function in response to a result of a comparison between said first count and said second count; and if said encore flag is determined to be not set, thereby indicative of a timed encore function, enabling user input of a rewind time period and performing a second rewind function for said rewind time period.

9. A method as claimed in claim 8, wherein said first rewind function is terminated when said second count equals said first count.

10. A method as claimed in claim 8, wherein said reel pulse signals are generated by a sensor detecting rotation of reels carrying said video tape.

11. A method as claimed in claim 8, wherein said user designates said encore start position by activating a play key, said play key also for activating said play function.

12. A method as claimed in claim 8, wherein said first rewind function is a reverse picture search function.

* * * * *